United States Patent
Omata

(10) Patent No.: US 7,697,036 B2
(45) Date of Patent: Apr. 13, 2010

(54) DIGITAL CAMERA FOR CAPTURING BOTH STILL IMAGES AND MOVING PICTURES

(75) Inventor: Kyouichi Omata, Tokyo (JP)

(73) Assignee: Uniden Corporation, Tokyo (JP)

( * ) Notice: Subject to any disclaimer, the term of this patent is extended or adjusted under 35 U.S.C. 154(b) by 1061 days.

(21) Appl. No.: 11/176,641

(22) Filed: Jul. 7, 2005

(65) Prior Publication Data

US 2006/0203099 A1     Sep. 14, 2006

(30) Foreign Application Priority Data

Mar. 8, 2005    (JP) ............................. 2005-063563

(51) Int. Cl.
H04N 5/225  (2006.01)
(52) U.S. Cl. .................. 348/220.1; 348/222.1
(58) Field of Classification Search ............. 348/220.1, 348/222.1; 386/109, 110, 111
See application file for complete search history.

(56) References Cited

U.S. PATENT DOCUMENTS

| 5,915,043 | A | 6/1999 | Ueda | |
|---|---|---|---|---|
| 7,110,025 | B1 * | 9/2006 | Loui et al. | 348/220.1 |
| 2005/0001908 | A1 * | 1/2005 | Lee | 348/231.2 |

FOREIGN PATENT DOCUMENTS

| AU | 9942435 A | * | 3/2000 |
|---|---|---|---|
| JP | 07-284058 A | | 10/1995 |
| JP | 08-32963 A | | 2/1996 |
| JP | 2000-165820 A | | 6/2000 |
| JP | 2004-120403 A | | 4/2004 |

* cited by examiner

Primary Examiner—Lin Ye
Assistant Examiner—Nelson D. Hernández Hernández
(74) Attorney, Agent, or Firm—Steven J. Hultquist; Intellectual Property/Technology Law

(57) ABSTRACT

A digital camera enabling a photographer to select representative frames reflecting his intentions, which captures both moving pictures and still images, and encodes moving picture data by frame correlation compression. The camera includes an image processing section that increases the number of I pictures in compressed moving picture data captured before, or before and after, a still image recording (SIR) instruction is received during moving picture acquisition. By this arrangement, continuous image data can be buffered for a fixed time period, and when a SIR instruction is given, this image data can be compressed and recorded as I pictures with the data being traced back for a fixed time period. As a result, image data further in the past by a fixed time period than the time at which the SIR instruction is given can be acquired as I pictures, enabling the user to select intended representative frames.

13 Claims, 2 Drawing Sheets

I B B B P B B B B P B B B I

DIGITAL CAMERA FOR CAPTURING BOTH STILL IMAGES AND MOVING PICTURES

CROSS-REFERENCES TO RELATED APPLICATIONS

This application relates to and claims priority from Japanese Patent Application No. 2005-063563, filed on Mar. 8, 2005, the entire disclosure of which is incorporated herein by reference.

BACKGROUND

The present invention relates to a digital camera which has the function of capturing both still images and moving pictures.

Digital cameras generally mount an imaging element which outputs an original image signal of the object of imaging, a signal processing circuit which produces digital original image data on the basis of the original image signal output by the imaging element, an encoding circuit which compresses and encodes the original image data output from the signal processing circuit, and a memory circuit which stores the compressed encoded data output from the encoding circuit. In the encoding circuit, for example, the original image data is compression-encoded by means such as discrete cosine transformation, quantization, variable length encoding or the like. For instance, JPEG (Joint Photographic Coding Experts Group) is known as a standard using discrete cosine transformation, quantization, Huffman encoding or the like. Furthermore, for example, motion JPEG is known as a standard for compression-encoding a plurality of images that are continuous in a time sequence according to the JPEG standard. Furthermore, for example, MPEG (Moving Picture Experts Group) is known as a standard for compression-encoding moving pictures consisting of a plurality of images that are continuous in a time sequence. I pictures (Intra Pictures) which are intra-frame encoded images, P pictures (Predictive Pictures) which are inter-frame encoded images and B pictures (Bidirectionally Predictive Pictures) which are bidirectionally predictive encoded images are used in MPEG image compression.

As the performance of digital cameras has improved, digital camera models that have the function of taking both still images and moving pictures have been developed. In such digital camera models, the following function is provided: namely, typical frames are selected from the plurality of frames making up the moving pictures that are taken by the digital camera, and these frames are handled as still images. A technique for simplifying the determination of representative frames that reflect the intentions of the photographer is proposed in Japanese Patent Laid-open No. 2004-120403. In the same reference, the imaging section of the digital camera transmits the respective frames obtained by continued imaging of the object of imaging to a ring buffer in the order of image acquisition. The ring buffer stores the transmitted frames in the order in which these frames are received. When the shutter switch is depressed during imaging, a tag information producing section creates representative frame discriminating information which indicates that the frame imaged while the shutter switch is depressed are representative frames. After a specified time has elapsed from the depression of the shutter switch, the image data creating section prepares each representative frame stored in the ring buffer and a plurality of frames preceding and following the imaging of this representative frame as one set of image data, and attaches representative frame discriminating information.

SUMMARY

In most cases, however, the representative frames intended by the photographer are not the frames that are captured at the instant in time at which the still image recording button is depressed, but are instead frames that are captured at a time that is slightly further in the past than the time at which the still image recording button is depressed, so that the photographer cannot readily acquire the intended representative frames.

Generally, furthermore, since frame correlation compression is performed in the compression-encoding of moving picture data, it is difficult to acquire one frame at a certain instant in time as a still image. Representative frames can be obtained by compression-encoding all of the captured image data using the JPEG system, and extractive several preceding and following frames captured during the depression of the still image recording button; in this case, however, since the process is similar to the creation of compressed image data by means of motion JPEG, the memory capacity required in order to store the compressed image data is extremely large, so that such a process is undesirable.

Furthermore, in the case of a construction in which a switch is made from the moving picture recording mode to the still image recording mode, the operation becomes complicated, and there is a danger that the shutter chance will be missed; consequently, such a construction is undesirable.

Accordingly, it is an object of the present invention to solve such problems, and to provide a digital camera which allows the easy selection of representative frames that reflect the intentions of the photographer.

In order to solve the abovementioned problems, the digital camera of the present invention is a digital camera which has the function of capturing both moving pictures and still images, and which compression-encodes moving picture data by means of a frame correlation compression system, this digital camera comprising an image processing section which increases the number of I pictures of the compressed moving picture data captured in the period prior to the still image recording instruction, or before and after this instruction, in cases where a still image recording instruction is received during moving picture acquisition. In such a construction, continuous moving picture data can be buffered for a certain fixed period of time, and when a still image recording instruction is given, this image data can be compressed and recorded as I pictures traced back for this fixed period of time. As a result, the image data for a fixed period of time following the instant in time at which the abovementioned still image recording instruction is given can be acquired as I pictures, so that representative frames intended by the photographer can be selected.

For example, a construction comprising an imaging element which captures images that have a resolution higher than the resolution of I pictures, a reduction processing section which subjects the images captured by the imaging element to reduction processing, a moving picture compression section which subjects the images that have been subjected to reduction processing by the reduction processing section to intra-frame encoding processing, thus producing I pictures, an expansion processing section which subjects the I pictures produced by the moving picture compression section to expansion processing, and a still image compression section which produces still image data in which the difference information between the I pictures that have been subjected to the expansion processing by the expansion processing section and the images captured by the imaging element is subjected to image compression, is desirable as the construction of the image processing section.

Furthermore, for example, a construction which further comprises a display device for displaying moving pictures or still images, wherein the image processing section subjects the I pictures produced by the moving picture compression section to expansion processing by means of the abovementioned expansion processing section, and adds the I pictures that have been subjected to expansion processing to the still image data produced by the still image compression section, when a still image playback instruction is received, and the display device displays still images on the basis of the image data produced by this addition processing, is desirable as the construction of the digital camera of the present invention.

Furthermore, the image processing section may also be constructed so that marker information is recorded on the I pictures when a still image recording instruction is received during the imaging of moving pictures. As a result, the search for marker positions is facilitated, so that this is convenient for use in the search for representative frames. In particular, the head picture of the period in which the number of I pictures is added is ideal as the marker position.

Furthermore, the image processing section may also be constructed so that when a still image playback instruction is received during moving picture playback, the moving picture is caused to undergo fast rewind to the I picture in which the marker information is recorded, and a moving picture is produced from the I picture in which the marker information is recorded to the I picture at the time point at which the still image recording instruction is received. As a result of such a construction, the search for representative frames is facilitated. Furthermore, moving picture production from the I picture in which the marker information is recorded to the I picture at the time point at which the still image recording instruction is received may also be performed by frame advance or slow playback.

In the present invention, when continuous image data is buffered for a certain fixed period of time, and a still image recording instruction is given, this image data can be compressed and recorded as I pictures that are traced back for this fixed period of time. As a result, image data that is further in the past by a fixed time than the instant in time at which the still image recording instruction is given can be acquired as I pictures; accordingly, representative frames intended by the user can be selected.

DETAILED DESCRIPTION

Figure 1:
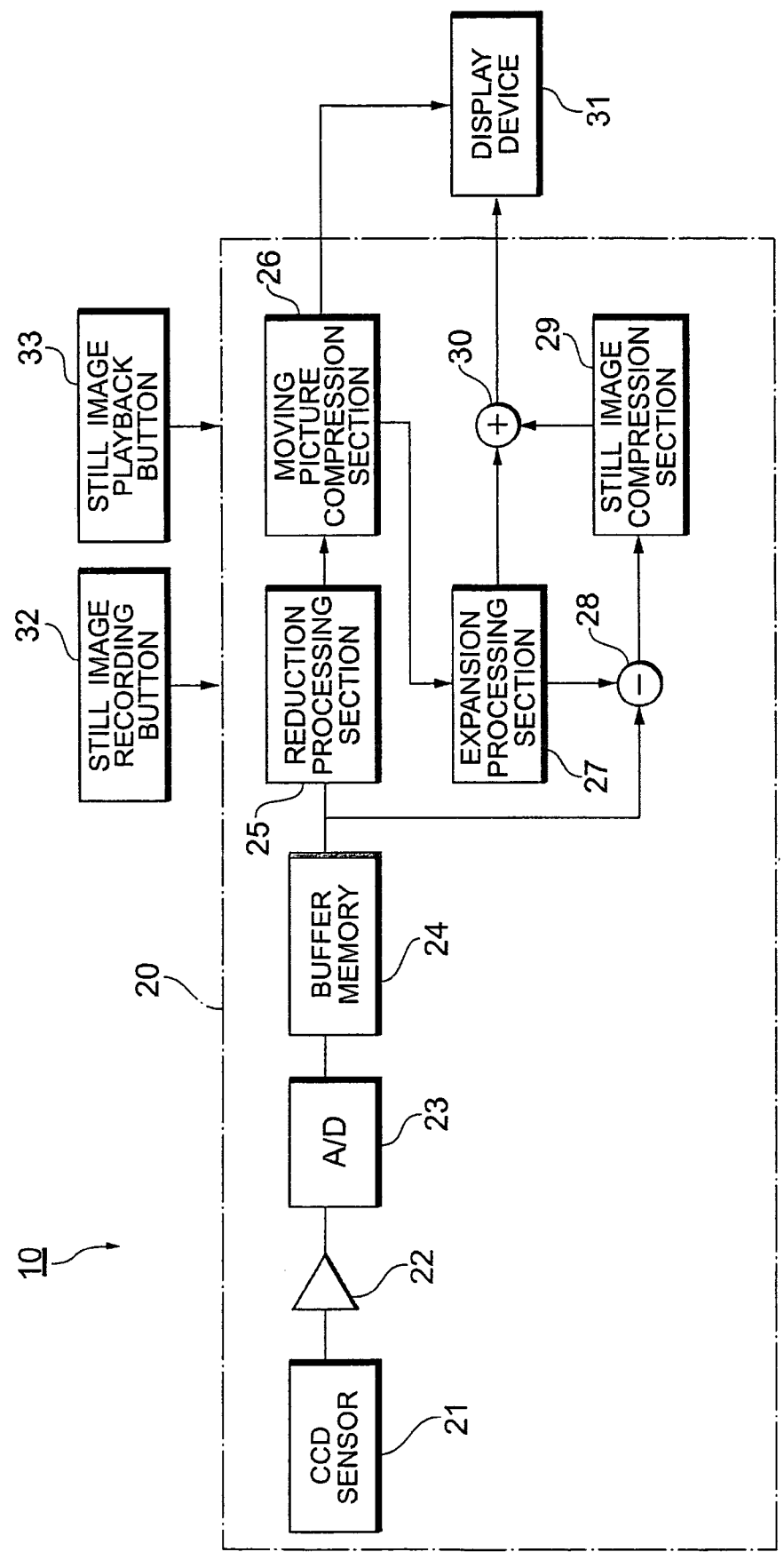
FIG. 1 is a system structural diagram of the digital camera of the present embodiment.

FIG. 1 shows a system structural diagram of the digital camera of the present embodiment.

The digital camera 10 has the function of capturing both moving pictures and still images, and compression-encodes moving picture data by means of the MPEG system. The digital camera 10 is constructed mainly from an image processing section 20, a display device 31, a still image recording button 32, and a still image playback button 33. The still image recording button 32 constitutes input means used to give still image recording instructions to the image processing section 20, and the still image playback button 33 constitutes input means used to give still image playback instructions to the image processing section 20. The image processing section 20 comprises a CCD (Charge Coupled Device) sensor 21, a gain controller 22, an A/D converter 23, a buffer memory 24, a reduction processing section 25, a moving picture compression section 26, an expansion processing section 27, a subtraction processing section 28, a still image compression section 29, and an addition processing section 30.

The CCD sensor 21 is an imaging element (charge coupled element) which converts light information regarding the object of imaging into an electrical signal; for example, this sensor 21 is constructed from a CMOS (Complementary Metal Oxide Semiconductor) image sensor or the like. The CCD sensor 21 captures images that have a resolution higher than the resolution of the compression-encoded data (I pictures) produced by the moving picture compression section 26. The electrical signals that are output from the CCD sensor 21 are subjected to a sensitivity adjustment for the respective colors of R, G and B in the CCD sensor 21 by the gain controller 22, and are then input into the A/D converter 23 as signals of the respective colors R, G and B for each pixel. The image data that is output from the A/D converter 23 is buffered in the buffer memory 24. For example, the buffer memory 24 is an FIFO (First in First Out) buffer such as a ring buffer or the like. After a fixed delay time has elapsed, the image data buffered in the buffer memory 24 is output to the reduction processing section 25. The reduction processing section 25 subjects the image data output from the buffer memory 24 to reduction processing, and outputs this image data to the moving picture compression section 26.

The moving picture compression section 26 compression-encodes the reduced image data by means of an MPEG system. When moving pictures are compressed in the case of MPEG, three types of information compression processing, i.e., spatial information compression, temporal information compression and variable length encoding compression, are performed.

In the case of spatial information compression, the images are compressed by eliminating redundancy in the spatial region of each still image. In natural images, as the region is narrowly limited, the level values of the pixels commonly approach each other, so that the variation (spatial frequency) of the pixel values in a certain region (space) is relatively small. Accordingly, if the pixels are converted into data for the spatial frequency regions, this data is biased toward the low frequency side of the spatial frequency, so that pixels can be encoded with a small amount of data overall by assigning numbers of bits that are smaller than those of data on the high frequency side to data on the low frequency side. In the case of MPEG, a discrete cosine transformation is used for this spatial frequency conversion; for example, the input pixels are subjected to a discrete cosine transformation for respective blocks of 16×16 pixels.

In the case of temporal information compression, moving pictures are compressed by eliminating redundancy in the temporal region of the moving pictures. Moving pictures are constructed from numerous still images called frames, and almost all of these frames are continuous still images taken at intervals of 1/30 sec or less. Consequently, preceding and following images have a close resemblance to each other. Accordingly, the amount of data can be reduced by extracting and encoding only the difference from the current frame on the basis of the immediately preceding frame (inter-frame prediction). Furthermore, if an object moving within an image is detected, and this movement is predicted and the difference from the current frame extracted (movement compensation), the precision of prediction can be improved, so that the amount of data can be further reduced.

In the case of variable length encoding, the frequency of occurrence is investigated for each bit sequence constituting the image data for which the abovementioned spatial information compression processing and temporal information compression processing were performed, and short codes are assigned to bit sequences with a high frequency of occurrence, while long codes are assigned to bit sequences with a low frequency of occurrence, thus compressing the image data. In this case, Huffman encoding or the like is widely used.

In the case of MPEG, for example, GOP (Groups of Pictures) in which frames adding up to a time of approximately 0.5 sec (15 frames) are grouped together are taken as the processing units. As a result, random access to moving pictures is possible in GOP units, so that trick modes such as playback from an intermediate point, rewind, reverse playback and the like can be realized.

Figure 2:
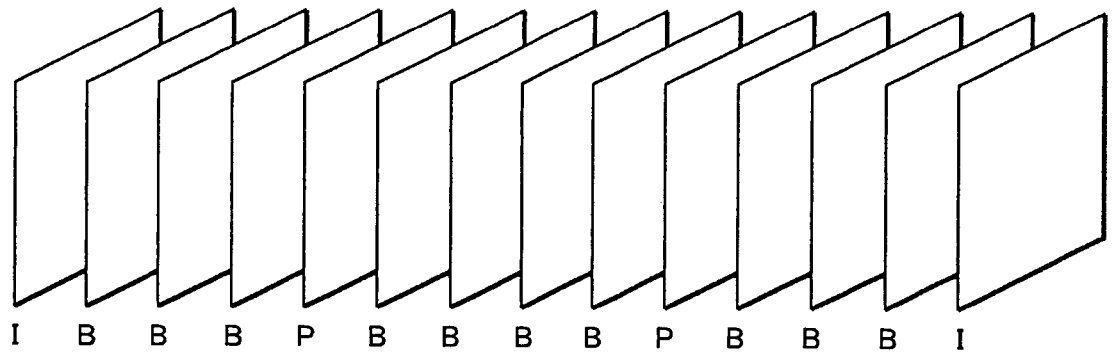
FIG. 2 is an explanatory diagram of GOP in MPEG.

As is shown in FIG. 2, three times of compressed data, i.e., I pictures, P pictures and B pictures, are present in a single GOP. I pictures constitute completed compressed data equal to the original frame serving as a reference for temporal information compression in the GOP; a minimum of one of these I pictures is required inside one GOP. P pictures constitute compressed data in which the difference from an I-picture or P-picture frame that is located further in the past than the corresponding frame (unidirectional inter-frame prediction) is recorded. B pictures constitute compressed data in which the differences from two I-picture or P-picture frames positioned further in the past and further in the future than the corresponding frame (bidirectional inter-frame prediction) are recorded. In the case of B pictures, since frames that are located further in the future that the "own" frame are used in inter-frame prediction, sorting into the original frame order is performed in the encoding processing, so that an order succeeding in the order of the pictures of the two frames used in this bidirectional inter-frame prediction is produced.

When a still image recording instruction is given to the image processing section 20 as a result of the still image recording button 32 being depressed by the user, an I picture (one frame of the moving picture) produced by the moving picture compression section 26 is transferred to the expansion processing section 27, and is subjected to expansion processing. Then, this I picture and the image data that is the source of production of this I picture (i.e., the high-resolution image data captured by the CCD sensor 21) are subjected to subtraction processing by the subtraction processing circuit 28, thus producing difference information for both sets of data. The still image compression section 29 produces and accumulates still image data in which this difference information is subjected to image compression.

In the abovementioned construction, in the case of moving picture playback, the display device 31 decodes the compressed encoded data produced by the moving picture compression section 26, and plays back the moving picture. Furthermore, when the still image recording button 32 is depressed so that a still image recording instruction is given to the image processing section 20, the I pictures produced by the moving picture compression section 26 and the difference information of the high-resolution image data captured by the CCD sensor 21 are subjected to image compression by the still image compression section 29, and this data is accumulated as still image data. Furthermore, when the still image playback button 33 is depressed so that a still image playback instruction is given to the image processing section 20, the I pictures produced by the moving picture compression section 26 and the still image data produced by the still image compression section 29 are subjected to addition processing by the addition processing section 30, so that still image data with a high resolution is produced. This still image data is transferred to the display device 31, and is displayed as still images.

Figure 3:
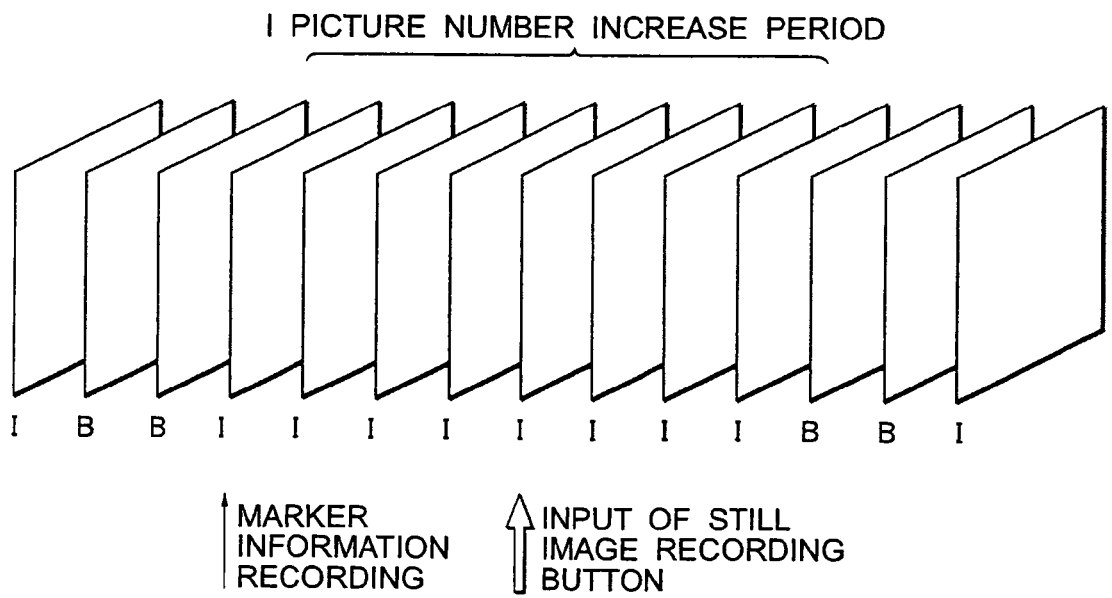
FIG. 3 is an explanatory diagram of GOP in a cases where the number of I pictures is added.

Here, the processing that is performed when a still image recording instruction is given to the image processing section 20 will be described in detail. As is shown in FIG. 3, when a still image recording instruction is given, the moving picture compression section increases the number of I pictures of the moving picture compressed data captured in the period around the time at which the still image recording instruction is given. As was described above, the buffer memory 24 has an FIFO structure, and the image data captured by the CCD sensor 21 is accumulated for a fixed period of time; accordingly, past image data captured prior to the time at which the still image recording instruction was given is accumulated in the buffer memory 24. When the moving picture compression section 26 subjects the image data captured in the period before or before and after the time at which the still image recording instruction is given (the period of increase in the number of I pictures), the number of I pictures is increased to a number that is greater than usual. In FIG. 3, an example is shown in which all of the image data captured in the period of increase in the number of I pictures is take as I pictures; however, it is not absolutely necessary that all of the image data captured in the period of increase in the I pictures be such I pictures.

Furthermore, if marker information is recorded on the head picture of the period of increase in the number of I pictures, searching for the head picture is facilitated; accordingly, such recording is desirable.

The image processing section 20 may be constructed so that when the image processing section 20 receives a still image playback instruction during moving picture playback, the moving picture is fast-rewound to the I picture on which the marker information is recorded, and a moving picture is produced from the I picture on which the marker information is recorded to the I picture at the time point at which the still image recording instruction is received, after which the moving picture playback is stopped. Furthermore, moving picture production from the I picture on which the marker information is recorded to the I picture at the time point at which the still image recording instruction is received may also be accomplished by frame advance playback or slow playback. Since the number of I pictures produced in the period of increase in the number of I pictures is greater than usual, it is possible to perform more accurate frame advance playback or slow playback. Moreover, still images may also be played back by adding the difference information accumulated in the still image compression art 29 to the I pictures utilized in frame advance playback or slow playback.

In the present embodiment, continuous image data is buffered for a fixed period of time, and when a still image recording instruction is given, this image data can be compressed and recorded as I pictures, with the data being traced back for this fixed period of time. As a result, image data located further in the past by a fixed period of time than the time at which the still image recording instruction is given can be acquired as I pictures, so that the user can select the intended representative frames.

Furthermore, since the CCD sensor 21 has a greater resolution than the size required for moving pictures, high-resolution still images can be played back while keeping the required memory capacity down by storing the difference information between the I pictures subjected to expansion processing and the original images.

Furthermore, when still images are played back, the user can easily select intended representative frames by performing fast rewind to the marker position, and frame advance playback or slow playback to the position where the still image recording instruction is given.

I claim:

1. A digital camera which has the function of capturing both moving pictures and still images, and which compression-encodes moving picture data by means of a frame correlation compression system producing I pictures, P pictures and B pictures, the digital camera comprising an image processing section including a moving picture compression section which compresses P pictures, B pictures, I pictures, in the moving picture data captured before, or before and after, a time at which a still image recording instruction is given, and upon determination of a still image recording instruction, the moving picture compression section compresses the moving picture data captured to produce an increased number of I pictures in the compressed moving picture data captured in the period before, or before and after, the time at which said still image recording instruction is given, when said still image recording instruction is received during moving picture acquisition.

2. The digital camera according to claim 1, wherein said image processing section comprises:
an imaging element which captures images that have a resolution higher than the resolution of said I pictures;
a reduction processing section which subjects the images captured by said imaging element to reduction processing;
a moving picture compression section which subjects the images subjected to reduction processing by said reduction processing section to intra-frame encoding processing, thus producing I pictures;
an expansion processing section which subjects the I pictures produced by said moving picture compression section to expansion processing; and
a still image compression section which produces still image data in which the difference information between the I pictures subjected to expansion processing by said expansion processing section and the images captured by said imaging element is subjected to image compression.

3. The digital camera according to claim 2, further comprising a display device for displaying moving pictures or still images, wherein when a still image playback instruction is received, said image processing section subjects the I pictures produced by said moving picture compression section to expansion processing by means of said expansion processing section, and adds the I pictures that have been subjected to the expansion processing to the still image data produced by said still image compression section, and said display device displays still images on the basis of the image data obtained by this addition processing.

4. The digital camera according to claim 3, wherein when a still image recording instruction is received during moving picture acquisition, said image processing section records marker information on said I pictures.

5. The digital camera according to claim 4, wherein said image processing section records said marker information on the head picture of the period in which the number of I pictures is increased.

6. The digital camera according to claim 5, wherein when a still image playback instruction is received during moving picture playback, the image processing section fast-rewinds the moving picture to the I picture in which said marker information is recorded, and produces a moving picture from the I picture in which said marker information is recorded to the I picture at the time point at which said still image recording instruction is received.

7. The digital camera according to claim 6, wherein said image processing section plays back still images by adding said difference information to the I picture at the time point at which said still image recording instruction is received.

8. The digital camera according to claim 6, wherein said image processing section performs moving picture production from the I picture on which said marker information is recorded to the I picture at the time point at which said still image recording instruction is received by frame advance playback.

9. The digital camera according to claim 6, wherein said image processing section performs moving picture production from the I picture on which said marker information is recorded to the I picture at the time point at which said still image recording instruction is received by slow playback.

10. A digital camera enabling a user to select representative frames reflecting the user's intentions, said digital camera being adapted to capture both moving pictures and still images, and encode moving picture data by frame correlation compression, including an image processing section that produces an increased number of I pictures in compressed moving picture data captured before, or before and after, a still image recording (SIR) instruction is received during moving picture acquisition, wherein the continuous image data is buffered for a fixed time period, and when a SIR instruction is given, the buffered image data is compressed and recorded as I pictures with the data being traced back for a fixed time period so that image data further in the past by a fixed time period than the time at which the SIR instruction is given is acquired as I pictures, enabling the user to select intended representative frames.

11. A digital camera adapted to capture both moving pictures and still images, which compression-encodes continuous image moving picture data, after buffering it for a predetermined period of time, by a frame correlation compression system that generates Groups of Pictures (GOP) units including I pictures, P pictures and B pictures as compressed data when a still image recording instruction is not being given, and that when a still image recording instruction is given generates GOP units, for said predetermined period of time prior to the time when the still image recording instruction was given, containing an increased number of I pictures in relation to GOP units generated when said still image recording instruction is not being given, said digital camera including an image processing section processing said GOP units containing an increased number of I pictures, and including a display device receiving a processing output of the image processing section, to display still images based on said processing.

12. The digital camera of claim 11, wherein the image processing section includes an expansion processing section that subjects I pictures to expansion processing, and a still image compression section that produces still image data in which difference information between I pictures that have been subjected to expansion processing by the expansion processing section and images captured by the camera, is subjected to image compression.

13. The digital camera of claim 11, wherein the image processing section includes an expansion processing section that subjects I pictures to expansion processing, and a still image compression section that produces still image data, and the image processing section adds the I pictures that have been subjected to expansion processing to the still image data produced by the still image compression section when a still image playback instruction is received, to produce still images, with a display device arranged to display the still images.

* * * * *